(12) United States Patent
Buchwald et al.

(10) Patent No.: US 8,165,034 B2
(45) Date of Patent: Apr. 24, 2012

(54) CONFIGURABLE ZONE-BASED LOCATION DETECTION

(75) Inventors: Jon Robert Buchwald, San Francisco, CA (US); Timothy Youngjin Sohn, San Diego, CA (US)

(73) Assignee: Jon Buchwald, San Francisco, CA (US)

( * ) Notice: Subject to any disclaimer, the term of this patent is extended or adjusted under 35 U.S.C. 154(b) by 1013 days.

(21) Appl. No.: 12/044,674

(22) Filed: Mar. 7, 2008

(65) Prior Publication Data

US 2008/0225810 A1    Sep. 18, 2008

Related U.S. Application Data

(60) Provisional application No. 60/918,321, filed on Mar. 16, 2007.

(51) Int. Cl.
*H04L 12/26*    (2006.01)
(52) U.S. Cl. .......... 370/252; 370/338; 342/357.02; 455/456.1
(58) Field of Classification Search .......... 370/328, 370/338; 455/456.1, 456.5, 456.6; 342/357.02
See application file for complete search history.

(56) References Cited

U.S. PATENT DOCUMENTS

| | | | |
|---|---|---|---|
| 5,852,630 A * | 12/1998 | Langberg et al. ......... 375/219 |
| 7,266,089 B2 | 9/2007 | Cook | |
| 7,293,104 B2 | 11/2007 | Krumm et al. | |
| 7,305,245 B2 * | 12/2007 | Alizadeh-Shabdiz et al. ......... 455/456.6 |
| 7,312,752 B2 * | 12/2007 | Smith et al. ......... 342/464 |
| 7,313,403 B2 * | 12/2007 | Gong et al. ......... 455/456.1 |
| 2004/0198386 A1 | 10/2004 | Dupray | |
| 2006/0030333 A1 | 2/2006 | Ward | |
| 2006/0123079 A1 | 6/2006 | Sturniolo | |
| 2006/0246886 A1 * | 11/2006 | Benco et al. ......... 455/422.1 |
| 2007/0171050 A1 * | 7/2007 | Westhoff et al. ......... 340/539.22 |
| 2007/0178911 A1 * | 8/2007 | Baumeister et al. ......... 455/456.1 |
| 2007/0202888 A1 * | 8/2007 | Brachet et al. ......... 455/456.1 |
| 2008/0174403 A1 * | 7/2008 | Wolpert et al. ......... 340/5.61 |

OTHER PUBLICATIONS

William G. Griswold, et al., "ActiveCampus—Experiments in Community Oriented Ubiquitous Computing", Department of Computer Science & Engineering, UC San Diego, La Jolla, CA, pp. 1-8.
Anthony Lamarca, et al., "Place Lab: Device Positioning Using Radio Beacons in the Wild", pp. 1-18.
Seeker Wireless, "Whitepaper", Jan. 2007, pp. 1-14.
SeekerZone, "Overview", homepage: www.seekerwireless.com. pp. 1-1 (printed from website on May 16, 2008).

(Continued)

*Primary Examiner* — Marsha D Banks Harold
*Assistant Examiner* — Bo Hui A Zhu

(57) ABSTRACT

An improved technique provides location detection using wireless net-works such as Wi-Fi networks in a flexible, configurable manner that allows for variations in the environment and tracks target movement accurately in such an environment. Zones of different relative sizes and sensitivities can be defined, so as to vary the degree of resolution for different parts of the area being detected. Mechanisms are provided to take into account fluctuations in signal strength, and reduce the incidence of false positives resulting from incorrectly detecting zone or location changes due to fluctuations of signal strength. In addition, detection time can be configured for zone entry and/or exit. Self-adjustment based on heuristic analysis can also be implemented. Data can be sent or received based on the physical location as determined by the zone.

11 Claims, 11 Drawing Sheets

OTHER PUBLICATIONS

SeekerZone, "Overview—Fixed Mobile Substitution", homepage: www.seekerwireless.com. pp. 1-1 (printed from website on May 16, 2008).

SeekerZone, "Overview—Mobile Advertising", homepage: www.seekerwireless.com. pp. 1-1 (printed from website on May 16, 2008).

Skyhook Wireless, "How It Works—Overview", homepage: www.skyhookwireless.com. pp. 1-3 (printed from website on May 16, 2008).

Skyhook Wireless, "How It Works—Architecture", homepage: www.skyhookwireless.com. pp. 1-2 (printed from website on May 16, 2008).

* cited by examiner

CONFIGURABLE ZONE-BASED LOCATION DETECTION

CROSS-REFERENCE TO RELATED APPLICATION

The present patent application claims priority from U.S. Provisional Patent Application Ser. No. 60/918,321, filed Mar. 16, 2007, for "Method to Improve Delivery of Location-Based Data to Mobile Devices", which is incorporated herein by reference.

FIELD OF THE INVENTION

The present invention relates to location detection, and more particularly to systems and methods for providing flexible, configurable, high-accuracy location detection using wireless networks such as Wi-Fi.

DESCRIPTION OF THE RELATED ART

Location detection for outdoor applications is commonly achieved using the Global Positioning System (GPS). GPS is a widely-used navigational system that provides location information as long as communication can be established with a sufficient number of GPS satellites.

For some applications, such as indoor applications where GPS satellites cannot be seen, or applications where the target device is not GPS-enabled, GPS is not a functionally useful solution. In such embodiments, triangulation of a target's location is often performed by measuring signal strengths for or at a number of fixed-location stations, referred to herein as access points. The target sends or receives signals to/from the fixed access points. The signal strength generally decreases as the target moves further away from the access point. Thus, the target's position can be ascertained based on the relative signal strength of the received signals.

Many existing techniques are zone-based, so that they operate by providing a set of access points within a location and associating each access point with a specific zone, or area, surrounding the access point. Thus, a location of a target can be determined, at least at a zone-specific level, by observing which access point has the strongest signal.

Existing location detection techniques that operate by signal strength measurement often fail to provide timely and accurate detection of location, primarily because of inherent fluctuations in signal strength owing to factors other than the target's distance from base stations. Wireless signals often fluctuate in strength; such fluctuations can result in an incorrect detection of a zone. Thus, existing systems can falsely detect zone or location changes that are the result of signal fluctuations rather than actual movement of the target.

In addition, existing techniques generally provide little or no control over the relative size of detection radii and are unable to self-adjust to provide continued accuracy when signal strengths fluctuate. Also, they generally fail to provide a way to create zones of differing relative sizes, other than to load an area with multiple access points. The problem with such a technique is that too many access points can create interference, resulting in a loss of accuracy and consistency. The amount of time needed to place and test such a setup also can be constraining.

Finally, existing techniques generally do not provide a mechanism for determining when a target is between two zones. In such a case, the signal strengths of two access points may fluctuate, but remain similar. Such evidence of a target residing between zones is often not detected, so it cannot be acted upon.

As a result of the above-described problems, existing techniques are often ill-suited to location detection in an indoor environment where signal strength is often variable and where high accuracy is needed to pinpoint a location.

SUMMARY OF THE INVENTION

The present invention provides an improved technique for location detection using wireless networks such as Wi-Fi networks. In one aspect, the present invention provides location detection in a flexible, configurable manner that allows for variations in the environment and tracks target movement accurately in such an environment. The invention is thus well suited to determining indoor location-based information.

In one aspect, the invention provides mechanisms that adjust detection accuracy and sensitivity, and that allow for control over the radius of detection.

In one aspect, the invention operates to detect the location of Wi-Fi-enabled mobile devices, and is therefore able to track devices that operate using IEEE 802.11 standards.

The invention has many applications, including for example the ability to transmit targeted advertising based on a detected location within a defined space. Thus, for example, a shopper's location inside a store can be detected, and a targeted advertisement or other location-specific information is sent to the shopper's mobile device. As the shopper moves through the store, different advertisements can be sent to the shopper's mobile device, depending on current location and other factors (such as known preferences, demographics, shopping history, and the like).

The present invention improves upon existing zone-based location detection systems in several ways, which can be implemented singly or in any combination.

In one aspect, the present invention provides the ability to define zones of different relative sizes, and thereby vary the degree of resolution for different parts of the area being detected. Larger zones provide lower levels of specificity as to location, while smaller zones provide higher levels of specificity.

In one aspect, the present invention also provides mechanisms that take into account fluctuations in signal strength, and reduce the incidence of false positives resulting from incorrectly detecting zone or location changes due to fluctuations of signal strength.

In one aspect, the present invention also provides the ability to specify different sensitivity levels for different zones. This allows certain key zones to be configured as more sensitive than others.

In one aspect, the present invention also provides a mechanism for configuring detection time. It often is useful to verify that a target has been inside a zone for some minimum amount of time before it is considered to be located there. The present invention allows such a minimum time to be specified, thus enhancing the configurability, adaptability, and flexibility of the location detection system. The present invention allows configuration of a factor known as "stickiness", which specifies a minimum time period that a target will be considered to be located in a zone, even if the target appears to have left the zone.

Mechanisms such as those described herein allow the present invention to compensate for detection toggling. In situations where signals from neighboring access points fluctuate, the detected zone can toggle repeatedly. The present invention automatically optimizes and self-adjusts its detection sensitivity based on observed signal fluctuations and movement through different areas, so as to avoid these problems. The present invention is also able to detect areas where zones overlap and/or intersect, and to make appropriate adjustments. A system operator can search for such areas, and the system provides advice as to adjustments that can be made to access point placement to avoid overlaps or intersections.

In one aspect, the present invention is also able to handle situations in which the target is located in multiple zones concurrently, or is in between zones.

By addressing the above-described problems and limitations of prior art systems, the present invention provides an improved system and method for location detection that is particularly suited to indoor environments requiring varying levels of precision, timing and zone size.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF THE EMBODIMENTS

System Architecture

Figure 1:
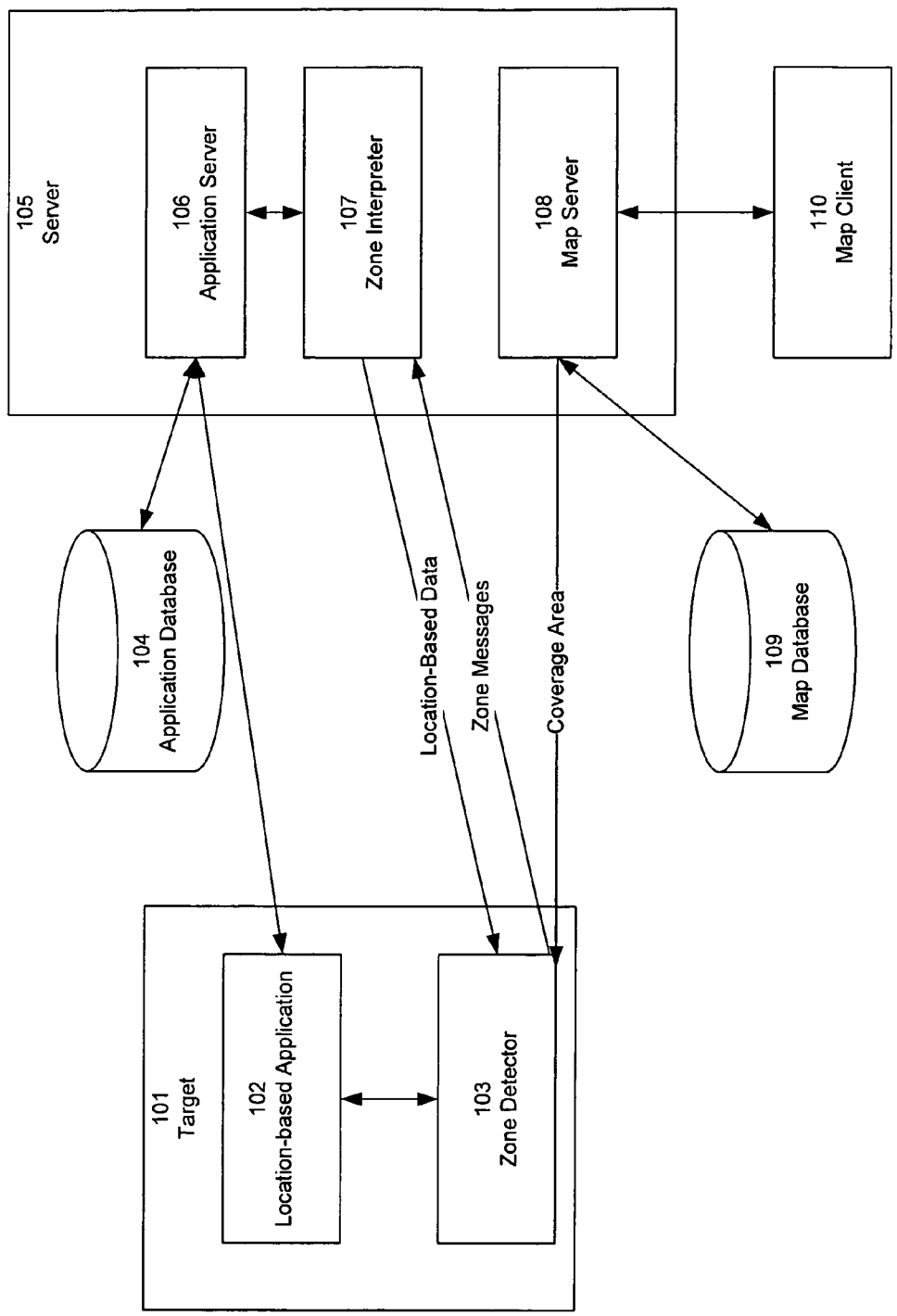
FIG. 1 is a block diagram depicting an example of a system architecture for practicing the present invention according to one embodiment.

Referring now to FIG. 1, there is shown a block diagram depicting an example of a system architecture for practicing the present invention according to one embodiment. In one embodiment, as illustrated, the invention is implemented using a client/server architecture, although one skilled in the art will recognize that other architectures are possible. For illustrative purposes, a single target 101 is shown, although one skilled in the art will recognize that the present invention can be implemented with any number of targets 101. In addition, a single server 105 is shown, although it may be beneficial in some cases to provide multiple servers 105. Communication between server 105 components and target 101 components can be accomplished using any known network communication protocol, including for example a wireless communication protocol.

Figure 2:
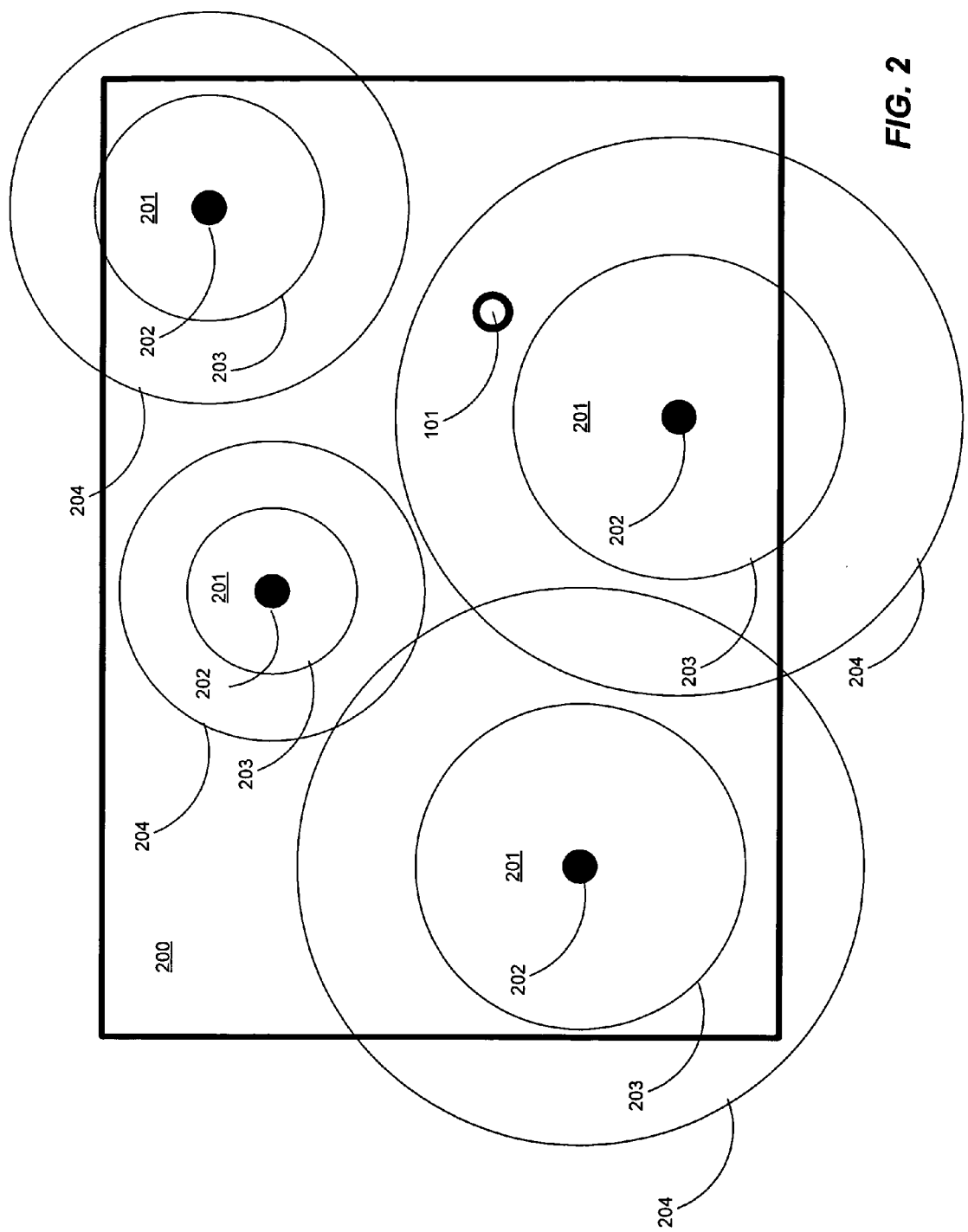
FIG. 2 is a diagram depicting an example of a coverage area including a number of zones and access points.

Referring also to FIG. 2, there is shown an example of a coverage area 200 including a number of zones 201 and access points 202. Target 101 is shown at a particular location within coverage area 200, for illustrative purposes. In one embodiment, each access point 202 is a device within a zone 201 that is capable of transmitting a signal to target 101. In one embodiment, each zone 201 has an access point 202. In one embodiment, each access point 202 is at a location substantially at the center of the corresponding zone 201. In one embodiment, each access point 202 communicates via the 802.11 wireless protocol, and has a known identifier such as a Media Access Control (MAC) address and/or Basic Service Set Identifier (BSSID). In other embodiments, the present invention can be implemented with radio frequency identification (RFID) technology, wherein each access point 202 would be an RFID sensor. In other embodiments, the present invention can be implemented with any other wireless technology, such as for example BlueTooth.

Target 101 is a device, such as a telephone, PDA, smartphone, laptop, handheld computer, or other mobile device whose location is to be ascertained by operation of the present invention. In one embodiment, target 101 is a mobile Wi-Fi-enabled device that is connected to a high speed internet connection, and that can access web services that reside on a server machine. For example, target 101 may communicate on a WLAN or other wireless network via an access point 202. Accordingly, in one embodiment, target 101 includes a wireless receiver and/or transmitter (not shown), for facilitating communication between its components and access points 202 and with server 105.

Zone detector 103 is a software application that runs on target 101. Zone detector 103 collects data about access points 202 that are visible to it and uses that data to determine which zone target 101 is in. Zone detector 103 maintains a current zone list, in order to keep track of which zones 201 target 101 is currently in. If the current zone list is null, then target 101 is not currently in any zones.

In order for zone detector 103 to interpret data obtained from access points 202, it first obtains a map of coverage area 200 from map server 108. Zone detector 103 then sends zone messages to zone interpreter 107 when it determines that target 101 has entered or exited a zone 201. Zone messages provide information as to target's 101 current location and zone(s) for use by application server 106 or another application. In one embodiment, zone messages are sent when the target enters or exits a zone 201.

Zone detector 103 may also send periodic zone messages to zone interpreter 107 even when target 101 has not entered or exited a zone 201. Specifically, in one embodiment, a zone broadcast setting may be provided, which specifies whether zone messages are sent periodically when target 101 remains within a particular zone 201. If the zone broadcast setting is set to False, then target 101 only broadcasts a zone message when it enters or exits a zone 201. If the zone broadcast setting is set to True, then target 101 also broadcasts a zone message periodically, such as after each sampling operation, as described in more detail below. In one embodiment, these periodic messages are sent based on a zone message rate of the current zone 201 of target 101.

Zone interpreter 107 performs server-side operations to determine the location of target 101 and to transmit location-based data to target 101 where appropriate. Location-based data can be any data sent to target 101 based on the location of target 101. This may include, for example targeted advertisements or other content. In one embodiment, zone interpreter 107 acknowledges zone messages by sending location-based data back to zone detector 103. Zone detector 103 receives the location-based data and passes this information to location-based application 102.

Location-based application 102 is a software application that runs on target 101 and that takes action or provides data to the target's 101 user, based on the zone 201 in which target 101 is located. Location-based application 102 receives location-based data from zone detector 103 by any known mechanisms for data exchange. Based on the zone 201 that in which target 101 is located, location-based application 102 takes some sort of action, such as displaying a location-specific advertisement or providing some other data to target's 101 user.

On server 105, application server 106 provides server-side application functionality that interacts with location-based application 102 on target 101. In one embodiment, application server 106 uses information in a zone message to perform some service and provide a response to target 101. For example, in the case of indoor retail advertising, the application server 106 may serve an advertisement based on an indication the target's 101 current zone 201. Where needed, application server 106 interfaces with application database 104, such as to obtain advertisements to be transmitted. In one embodiment, server 105 includes a wireless receiver and/or transmitter (not shown), for facilitating communication between server 105 and target 101.

Map database 109 is a database of coverage area maps indexed by a map identifier as described in the discussion of data structures. In one embodiment, map database 109 may be implemented in using SQL and/or XML, although one skilled in the art will recognize that any other database techniques may be used. Map server 108 saves map information to map database 109 and retrieves it when needed, such as when map information is requested by zone detector 103 of target 101. Map server 108 transmits requested information to zone detector 103. Map client 110 is a front-end user interface to map server 108 for providing a system operator with map and zone data when building coverage area maps. Map client 110 may run on any computer (not shown) or on a target 101 or other device.

In one embodiment, application server 106, zone interpreter 107, and map server 108, run on server 105.

Zone detector 103 and location-based application 102 may be integrated into a single application if desired, as may application server 106 and zone interpreter 107.

Coverage area 200 is the area in which it is desired to determine the location of a target. In one embodiment, coverage area 200 may be an indoor area of a structure such as a store; in other embodiments, the coverage area may be any other defined physical place.

Each zone 201 is a defined region within coverage area 200. Coverage area 200 is therefore divided into one or more zones 201, as described in more detail below. In some cases, some or all zones 201 may overlap one another. In some cases, certain parts of coverage area 200 may not be included in any zone 201.

In one embodiment, zones 201 are defined, explicitly or implicitly, in terms of entry radius 203 and exit radius 204. Each zone entry radius 203 is the distance from a zone's access point 202 where the relative likelihood that target 101 is considered to have entered the zone 201 is greater than or equal to the likelihood that target 101 has entered any other zone 201. Each zone exit radius 204 is the distance from a zone's access point 202 where the relative likelihood that target 101 is considered to have exited the zone 201 is greater than or equal to the likelihood that target 101 has entered any other zone 201.

The present invention operates by detecting relative signal strengths with respect to various access points 202. A signal strength is defined as the strength of a signal as detected at the recipient of the signal, such as, for example, the strength of an access point's 202 signal as detected by target 101. For purposes of the following description, a technique is described wherein access points 202 transmit signals to target 101, and where signal strength is measured at target 101. One skilled in the art will recognize that the invention can also be practiced in an embodiment wherein access points 202 receive signals from target 101, and wherein signal strength is measured at access points 202.

As will be described in more detail below, the present invention provides a great deal of flexibility in defining zones 201 and in establishing criteria for determining when target 101 has moved from one zone to another. This flexibility allows the present invention to perform detection operations with a high degree of reliability and accuracy even in situations where signal strength fluctuation may occur.

Method of Operation

Figure 3:
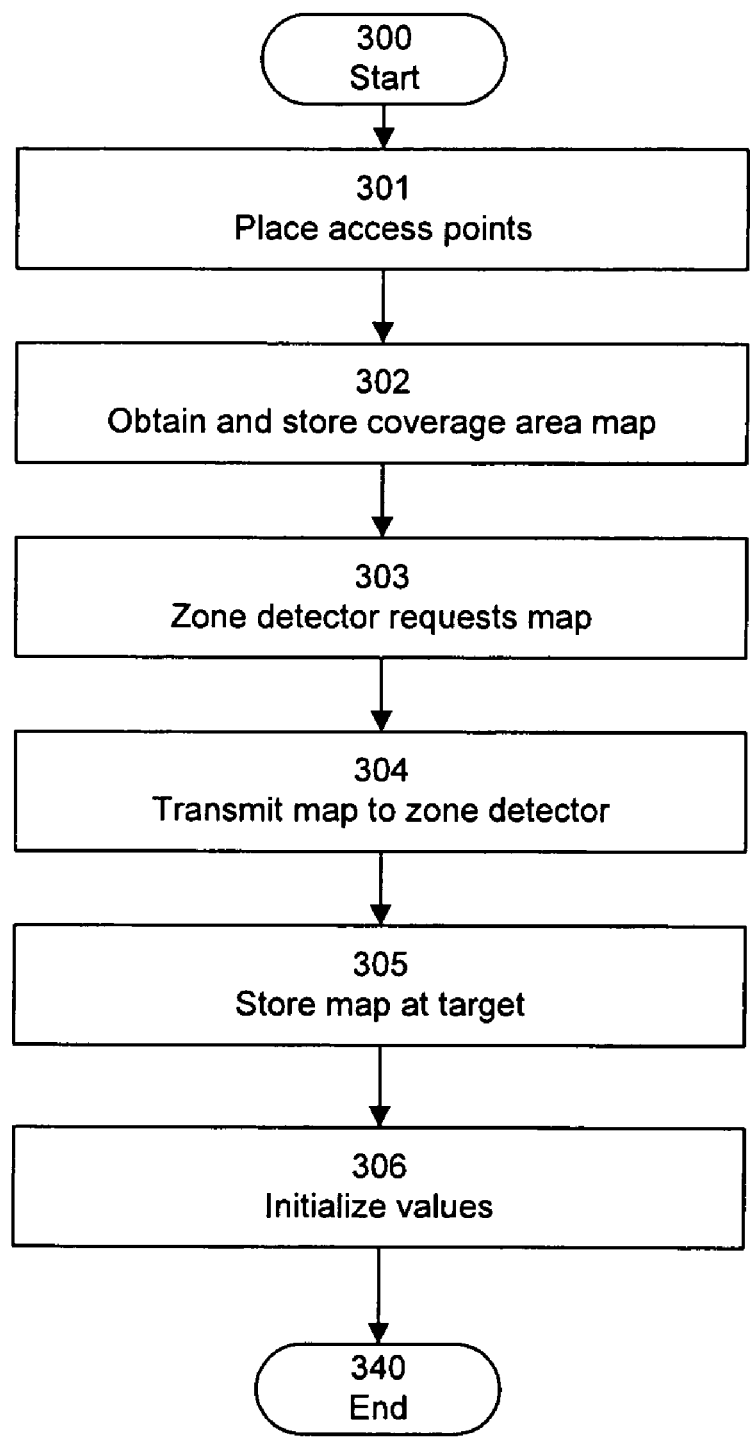
FIG. 3 is a flowchart depicting initialization steps for the invention, according to one embodiment.

Before the system of the present invention begins operation, some initialization takes place. Referring now to FIG. 3, there is shown a flowchart depicting initialization steps for the invention, according to one embodiment. The method is describe in terms of a single target 101; however, one skilled in the art will recognize that some of the steps will be repeated for each target 101 whose location is to be determined by the present invention.

Access points 202 are placed 301 at various locations within coverage area 200. In operation, each access point 202 broadcasts a continuous or periodic signal that contains its unique identifier, such as a MAC address or BSSID.

A coverage area map is generated or otherwise obtained 302 and stored in map database 109. In one embodiment, the coverage area map may be created by a system operator using map client 110. In other embodiments, the coverage area map may be obtained from some other source where it has been previously generated. The coverage area map specifies the geographic locations of access points 202 within coverage area 200.

Zone detector 103 requests 303 a coverage area map from map server 108. Map server 108 obtains the map from database 109 and transmits 304 a map of the current coverage area to zone detector 103. The map is stored locally 305 at target 101, so that its elements can be accessed. If target 101 later moves to a new coverage area 200, steps 303 through 305 are repeated for the new coverage area 200. Alternatively, if space is available, target 101 may store several coverage area maps so that it need not request a new map each time it re-enters a coverage area 200 it has visited before.

Zone detector 306 initializes values such as its current zone list and winner list to a null value. As will be described in more detail below, the current zone list is a list of zones 201 in which target 101 is currently located. The winner list is a list of access points 202 that have been determined to be the winning access point by virtue of their having the greatest detected signal strength. Additional details as to the process of determining a winning access point will be described below.

Once these initialization steps have been performed, zone detector 306 is ready to determine which zone(s) it is in, if any. In general, as will be described in detail, zone detector 306 sends a zone message to zone interpreter 107 when a zone is entered or exited. In addition, if the zone broadcast setting is set to True, zone detector 306 also sends a zone message to zone interpreter 107 after each sampling operation. Zone interpreter 107 passes the information received to application server 106 and receives data from application server 106. Zone interpreter 107 then passes the data back to zone detector 103, which makes it available to location-based application 102 on target 101 so that application 102 can act accordingly, for example by displaying information for the user. In one embodiment, application server 106 can also communicate directly with location-based application 102 on target 101.

Figure 4:
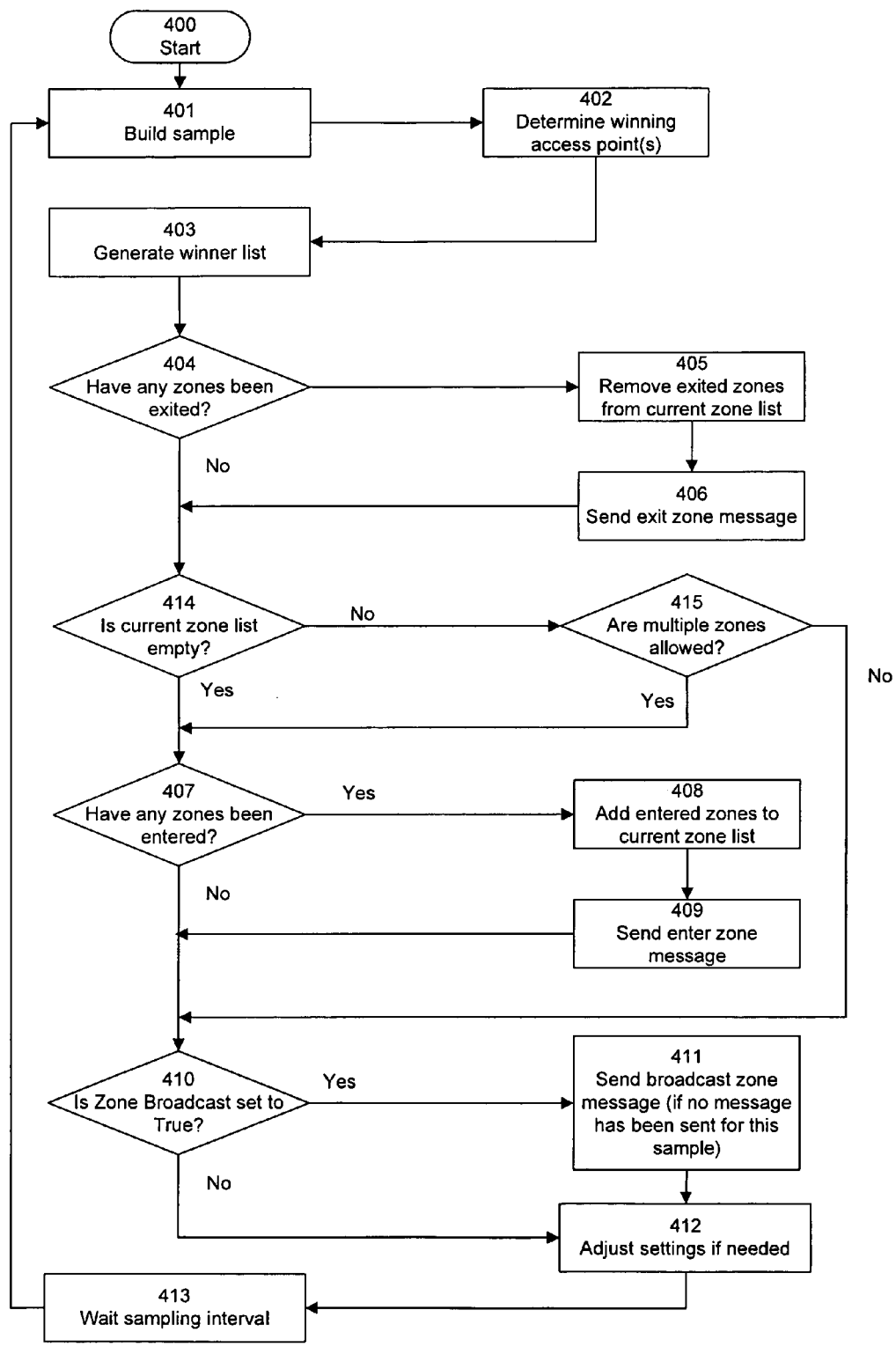
FIG. 4 is a flowchart depicting a location detection method for the invention, according to one embodiment.

Referring now to FIG. 4, there is shown a flowchart depicting a method of determining a location for target 101, according to one embodiment. In one embodiment, each target 101 performs the method of FIG. 4 repeatedly, at a frequency defined by a sampling rate. The sampling rate can be set by a system operator or other administrator. Different sampling rates can be defined for different zones 201. In addition, a default sampling rate can be provided for use when there is no current zone or more than one current zone. In one embodiment, a default sampling rate of 1 sample per second is defined.

As described, the process involves determining a current zone 201 or zones 201 for target 101. A current zone is a zone 201 that target 101 has entered but not yet exited.

Zone detector 102 of target 101 builds 401 a sample. A sample is a list of access points 202 that are in the current coverage area map and from which target 101 can detect a signal. In one embodiment, the list is in order of signal strength, for ease in determining which access point 202 has the highest signal strength. As discussed above, signal strength is defined as the strength of an access point's 201 signal as detected at target 101. A signal strength difference is the difference in magnitude between the signal strengths of two access points 201, as detected at target 101.

Zone detector 102 then determines 402 one or more winning access point(s) 201 from the sample. In one embodiment, a winning access point 202 is an access point 202 in the sample that has the greatest signal strength.

In one embodiment, an access point 202 is deemed to be the winning access point 202 only if its signal strength exceeds that of the access point 202 with the next highest signal strength by at least a predetermined amount, referred to as the signal strength margin requirement. The signal strength margin requirement may be set to any desired value by a system operator or other individual. If the signal strength margin requirement is zero, then the winning access point 202 is simply the access point 202 in the sample with the greatest signal strength.

In general, the signal strength margin requirement is the minimum signal strength difference between two access points 202 required to classify the signal strengths of the access points 202 as not equal to one another. In other words, the signal strengths of two access points 202 are considered to be equal to one another unless their signal strength difference is greater than or equal to the signal strength margin requirement. If the signal strength margin requirement is too large, it may become difficult or impossible to detect entry into a zone 201.

Generally there may only be one winning access point 202 in any given sample. However, a global Boolean setting called "Multiple Zone Allowance" specifies whether or not there can be more than one winning access point 202 for target 101 in a given sample. If the multiple zone allowance setting is set to True and there is more than one access point 202 with the greatest signal strength, all of those access points 202 are designated as winning access points 202. If the multiple zone allowance setting is set to False and there is more than one access point 202 with the greatest signal strength, then no winning access point 202 is determined (the value for the winning access point 202 is set to a null value). A larger signal strength margin requirement increases the probability that access points 202 will have signal strengths considered to be equal, and thus the probability that either no winning access point 202 will be detected (if multiple zone allowance is false) or multiple winning access points 202 will be detected (if multiple zone allowance is true). A system operator can change the multiple zone allowance setting if desired. The multiple zone allowance setting also determines whether or not there can be more than one zone 201 in the current zone list for a target 101.

A winner list is generated 403, consisting of a list of winning access points 202. If the multiple zone allowance setting is set to False, then there will be no more than one winning access point 202 on the winner list; otherwise there can be any number. If there is no winning access point 202, then the winner list is set to a null value. Additional details on the method of generating 403 a winner list are provided below in connection with FIG. 11.

Next, zone detector 103 determines 404, based on the winner list, whether any zones 201 have been exited since the last time a sample was built. Details concerning this step are described below in connection with FIG. 5. If a zone 201 has been exited, then the zone detector 103 removes 405 the zone 201 from its current zone list and sends 406 an exit zone message to zone interpreter 107. In one embodiment, zone interpreter 107 may reply to the exit zone message with information for location-based application 102. This information can be sent via zone detector 103 and/or via application server 106.

When the multiple zone allowance setting is False, a zone 201 cannot be entered until any previous current zone 201 has been exited. Accordingly, if the current zone list is not empty 414 (i.e., target 101 is currently in a zone 201), and the multiple zone allowance setting is False 415, then zone detector 103 skips to step 410.

Otherwise, zone detector 103 determines 408, based on the winner list, whether any zones 201 have been entered since the last time a sample was built. Details concerning this step are described below in connection with FIG. 6. If a zone 201 has been entered, then the zone detector 103 adds 408 the zone 201 to its current zone list and sends 409 an enter zone message to zone interpreter 107. In one embodiment, zone interpreter 107 may reply to the enter zone message with information for location-based application 102. This information can be sent via zone detector 103 and/or via application server 106.

In one embodiment, as described above, a zone broadcast setting may be provided, which specifies whether zone messages are sent periodically when target 101 remains within a particular zone 201. If the zone broadcast setting is set to True 410, then zone detector 103 sends 411 a broadcast zone message to zone interpreter 107 if no message has already been sent for the current sample. In one embodiment, zone interpreter 107 may reply to the broadcast zone message with information for location-based application 102. This information can be sent via zone detector 103 and/or via application server 106.

In one embodiment, settings can be adjusted 412 if needed to improved performance. Additional details on such adjustments are described below in connection with FIG. 7.

Next, zone detector 103 waits for a period defined by the sampling interval, which is the reciprocal of the sampling rate for the current zone or a default sampling rate. Then, zone detector 103 returns to step 401 to build a new sample.

Figure 11:
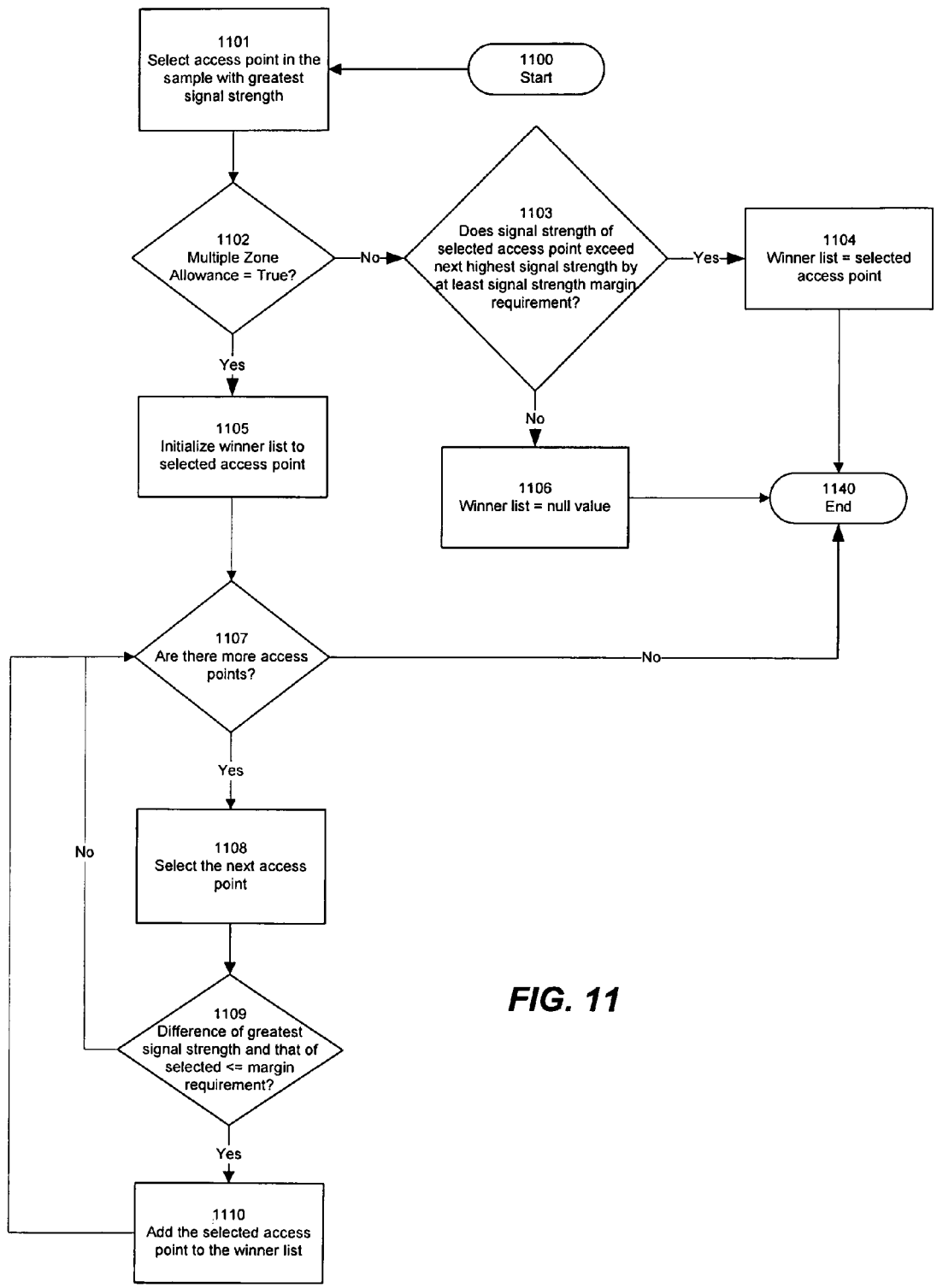
FIG. 11 is a flowchart depicting a method for generating a winner list, according to one embodiment.

Referring now to FIG. 11, there is shown a flowchart depicting a method for generating 403 a winner list,, consisting of a list of winning access points 202, according to one embodiment. First, zone detector 103 selects 1101 an access point 202 in the sample having the greatest signal strength. Zone detector 103 then determines 1102 whether the multiple zone allowance setting is True. If the multiple zone allowance setting is False, zone detector 103 determines 1103 whether the signal strength of the selected access point 202 exceeds the next highest signal strength by at least the signal strength margin requirement. If so, the winner list is determined 1104 to contain only the selected access point. If not, the winner list is determined 1106 to be a null value. The method ends 1140.

If, in 1102, the multiple zone allowance setting is True, zone detector 103 initializes 1105 the winner list to include the selected access point 202.

Zone detector 103 then determines 1107 whether there are any more access points 202. If not, the method ends 1140.

If there are any more access points 202, zone detector 103 selects 1108 the next access point and determines 1109 whether the difference between the greatest signal strength (of the access point 202 selected in 1101) and the signal strength of the access point 202 selected in 1108 is less than or equal to the margin requirement. If so, the access point 202 selected in 1108 is added 1110 to the winner list. Zone detector 103 then returns to 1107.

Figure 5:
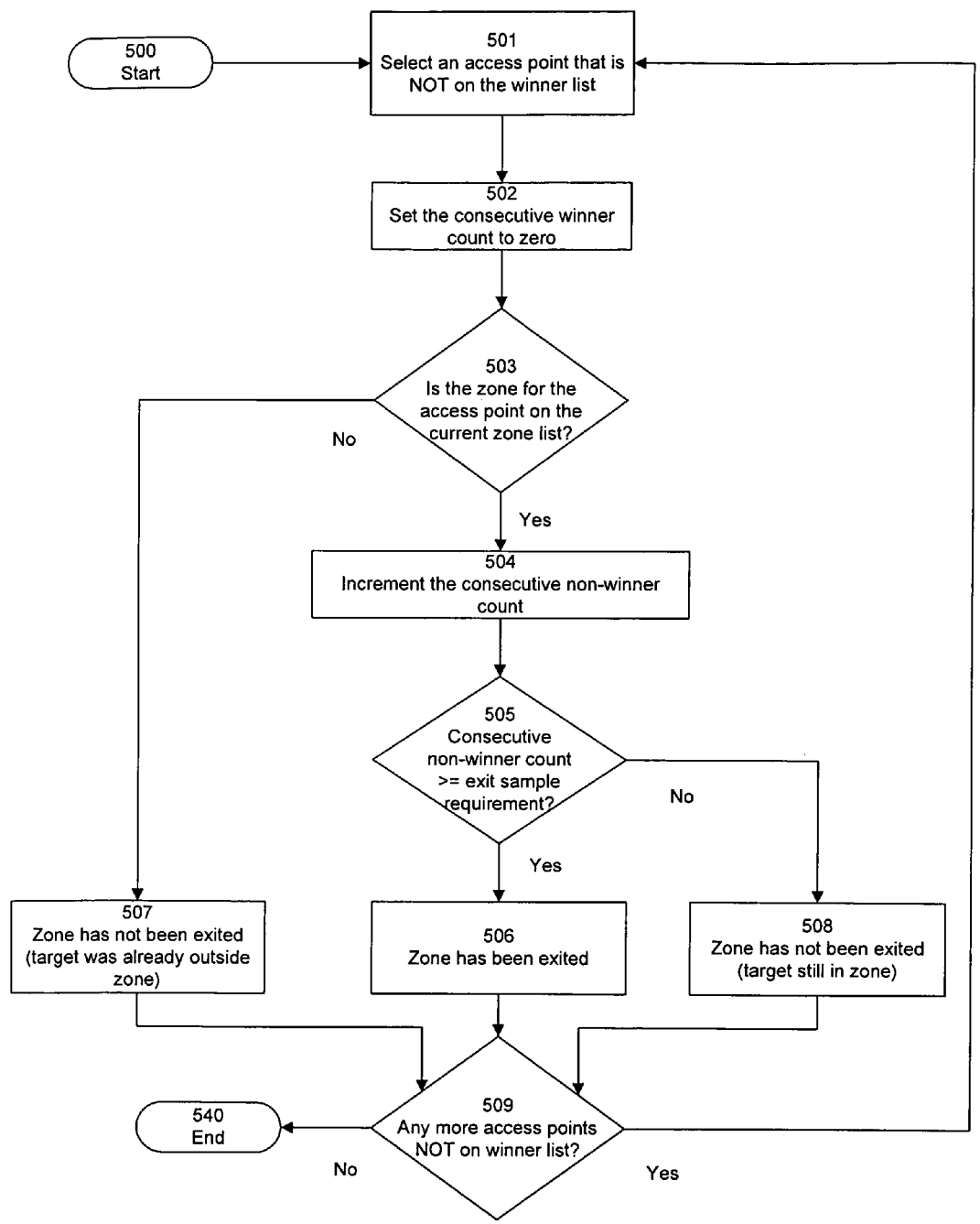
FIG. 5 is a flowchart depicting a method for determining whether any zones have been exited, according to one embodiment.

Referring now to FIG. 5, there is shown a flowchart depicting a method for determining 404 whether any zones have been exited, according to one embodiment. In one embodiment, the steps of the method are performed for each access point 202 that is not on the winner list, i.e. has not been determined to be a winning access point 202 in the current sample.

In one embodiment, zone detector 103 keeps track of at least two values for each access point 202: a consecutive winner count, indicating how many consecutive times the access point 202 has been determined to be a winning access point 202 for target 101; and a consecutive non-winner count, indicating how many consecutive times the access point 202 has not been determined to be a winning access point 202 for target 101.

An access point 202 that is not on the winner list is selected 501. (If there are no such access points 202, no zones have been exited). The consecutive winner count for access point 202 with respect to target 101 is set 502 to zero. Then, zone detector 103 determines 503 whether the zone 201 for the selected access point 202 is on the current zone list for target 101. If not, then zone detector 103 determines 507 that zone 201 has not been exited, since target 101 was already outside zone 201.

If, in 503, the zone 201 for the selected access point 202 is on the current zone list for target 101, zone detector 103 increments 504 the consecutive non-winner count.

Zone detector 103 then determines 505 whether the consecutive non-winner count meets or exceeds a predetermined threshold value referred to as the exit sample requirement. The exit sample requirement is a parameter that defines the number of consecutive samples in which a zone's 201 access point 202 is found not to be a winning access point 202, before target 101 will be determined to have exited that zone 201. In one embodiment, different exit sample requirements can be set for different zones 201, and/or a default exit sample requirement can be set. Increasing a zone's 201 exit sample requirement effectively increases the zone's 201 exit radius 204 and makes it more likely that a target 101 will be detected inside that zone 201 once it has entered.

If, in step 505, the consecutive non-winner count meets or exceeds the exit sample requirement, then zone detector 103 determines 506 that zone 201 has been exited. If not, zone detector 103 determines 508 that zone 201 has not been exited, and target 101 is considered to still be in zone 201.

Zone detector 103 then determines 509 whether there are any more access points 202 not on the winner list. If so, it returns to step 501 to select a new access point 202. If not, the method ends 540.

Figure 6:
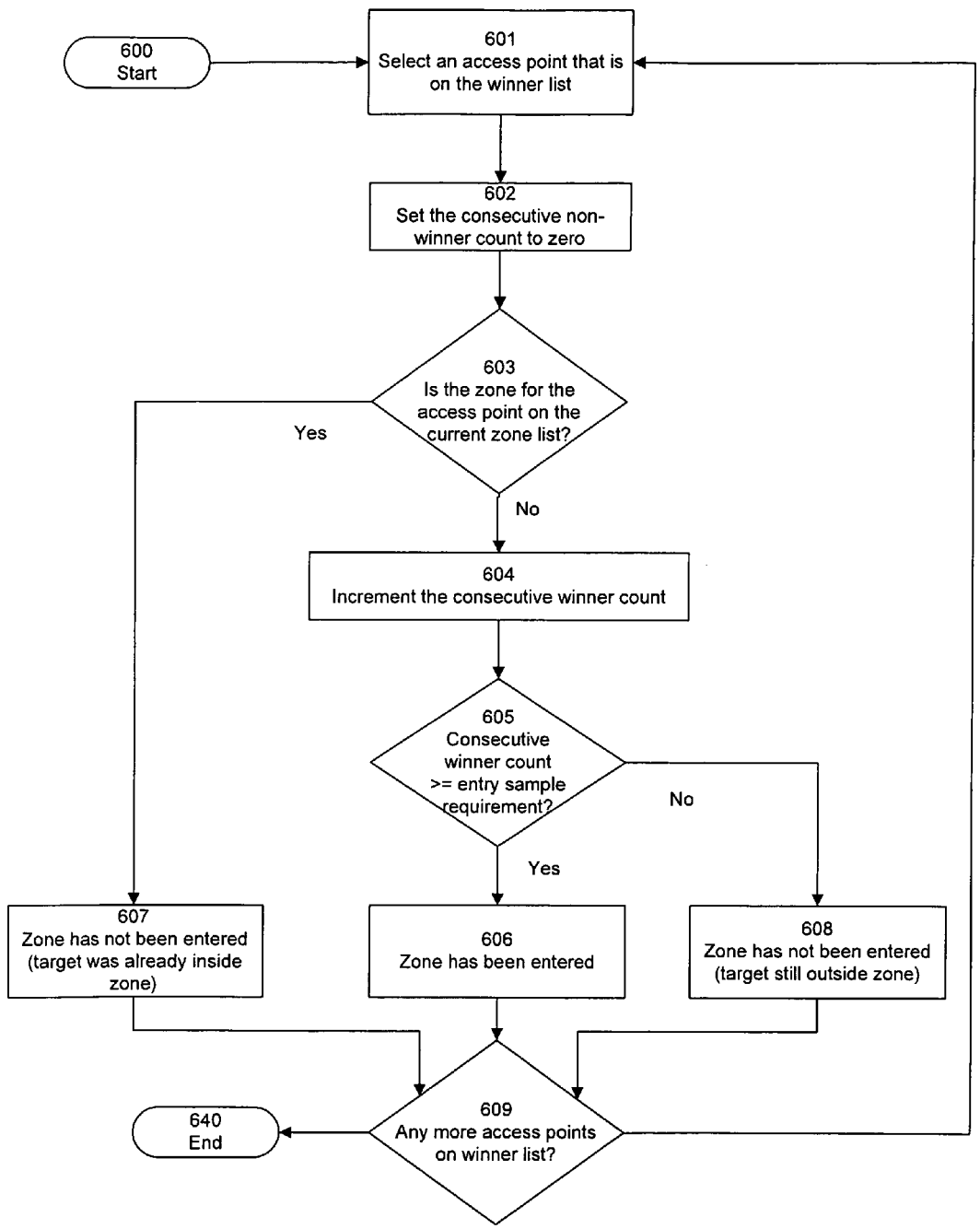
FIG. 6 is a flowchart depicting a method for determining whether any zones have been entered, according to one embodiment.

Referring now to FIG. 6, there is shown a flowchart depicting a method for determining 407 whether any zones have been entered, according to one embodiment. In one embodiment, the steps of the method are performed for each access point 202 that is on the winner list, i.e. has been determined to be a winning access point 202 in the current sample.

An access point 202 that is on the winner list is selected 601. (If there are no such access points 202, no zones have been entered). The consecutive non-winner count for access point 202 with respect to target 101 is set 602 to zero. Then, zone detector 103 determines 603 whether the zone 201 for the selected access point 202 is on the current zone list for target 101. If so, then zone detector 103 determines 607 that zone 201 has not been entered, since target 101 was already inside zone 201.

If, in 603, the zone 201 for the selected access point 202 is not on the current zone list for target 101, zone detector 103 increments 604 the consecutive winner count.

Zone detector 103 then determines 605 whether the consecutive winner count meets or exceeds a predetermined threshold value referred to as the entry sample requirement. The entry sample requirement is a parameter that defines the number of consecutive samples in which a zone's 201 access point 202 is found to be a winning access point 202, before target 101 will be determined to have entered that zone 201. In one embodiment, different entry sample requirements can be set for different zones 201, and/or a default entry sample requirement can be set. Increasing a zone's 201 entry sample requirement effectively increases the zone's 201 entry radius 203 and makes it more likely that a target 101 will be detected inside that zone 201.

If, in step 605, the consecutive winner count meets or exceeds the entry sample requirement, then zone detector 103 determines 606 that zone 201 has been entered. If not, zone detector 103 determines 608 that zone 201 has not been entered, and target 101 is considered to still be outside zone 201.

Zone detector 103 then determines 609 whether there are any more access points 202 on the winner list. If so, it returns to step 601 to select a new access point 202. If not, the method ends 640.

The minimum amount of time that target 101 must remain in a zone 201 before it is actually determined to be in zone 201 is a function of the entry sampling requirement and the sampling rate. The minimum amount of time that target 101 must remain outside a zone 201 before it is actually determined to be outside zone 201 is a function of the exit sampling requirement and the sampling rate.

It is sometimes appropriate to adjust settings in order to improve the performance of the system of the present invention. In one embodiment, the present invention is able to self-adjust upon recognizing certain problems. For example, in some situations, zone toggling may occur, where no zone entry or zone exit can be detected due to alternating detection of two or more winning access points 202. This may occur, for example when target 101 is an area where zones 201 overlap, or between neighboring zone boundaries whose access points 202 have similar signal strengths. Zone toggling is corrected, in one embodiment, by using a heuristic to expand or contract a zone's 201 radius. Expanding one zone 201 and contracting a neighboring zone 201 reduces overlap due to similar signal strengths, and can be used to force a clearer delineation between zones 201 when necessary.

A zone toggling correction setting may be set. In general, the multiple zone allowance setting and the zone toggling correction setting are mutually exclusive. Toggling generally takes place when target 101 is in between zones 201. Zone toggling correction is used to negate the effect of zone 201 overlap, whereas multiple zone allowance can detect zone 201 overlap and provide an opportunity to leverage it. Specifically, setting the multiple zone allowance setting to True can allow an operator to take special actions if the target is in an area where zones 201 overlap, and also can have the effect of combining several zones 201 into a single larger zone 201. However it can inhibit the detection of a zone 201 being exited.

Figure 7:
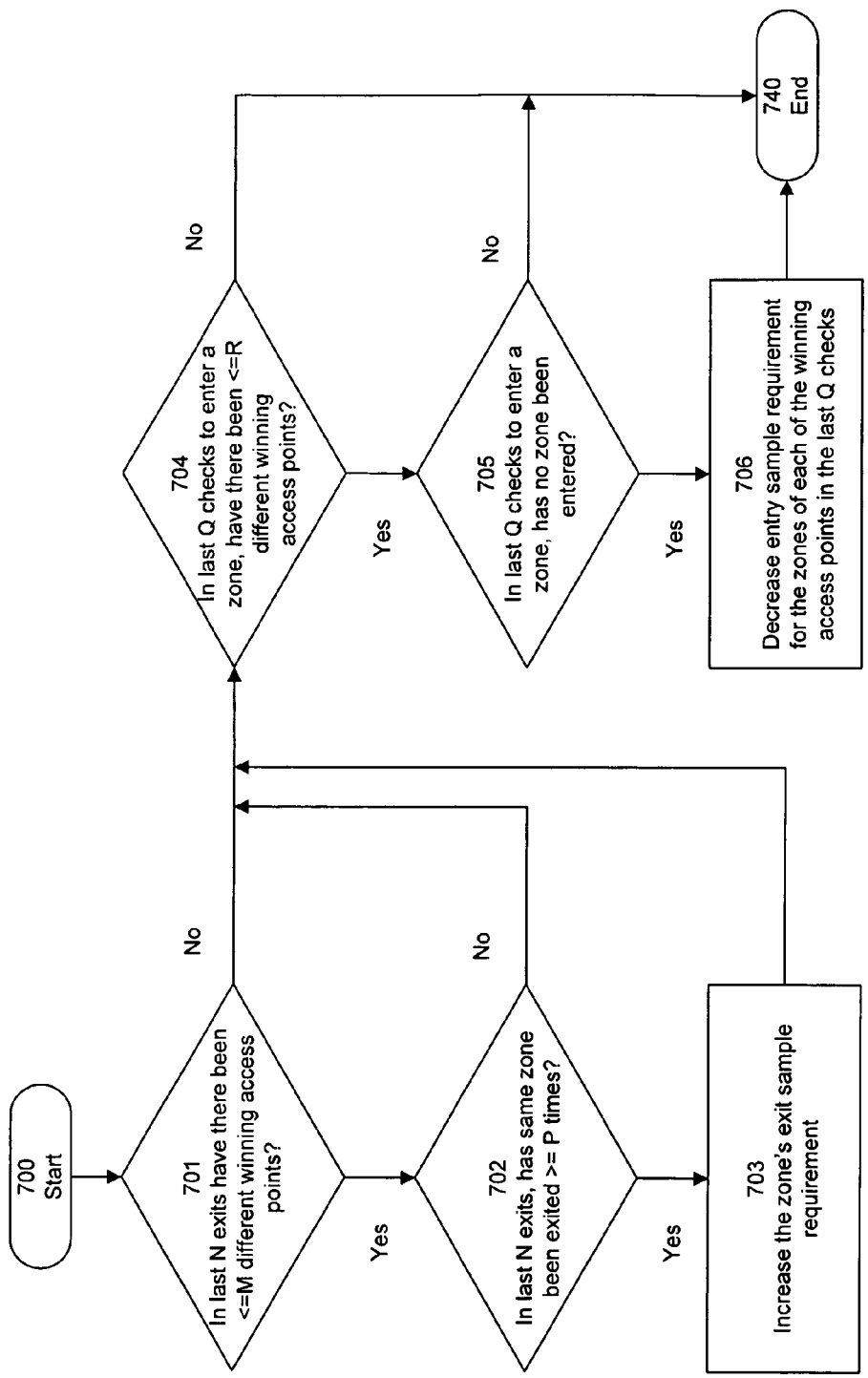
FIG. 7 is a flowchart depicting a method for adjusting settings to improve performance by reducing zone toggling, according to one embodiment.

If the zone toggling correction setting is set to True, then certain adjustments can be made when zone toggling is detected. Referring now to FIG. 7, there is shown a flowchart depicting an example of a method for adjusting settings to improve performance by reducing zone toggling, according to one embodiment.

First, a heuristic is employed to determine whether to increase exit sample requirements for any zones 201. Location detector 103 determines 701 whether, in the last N exits from any zone(s) 201, there have been fewer than or equal to M different winning access points 202.

If so, location detector 103 determines 702 whether, in the last N exits, the same zone 201 has been exited at least P times.

If so, this is an indication that the zone's 201 exit sample requirement may be too low, causing toggling; accordingly, the exit sample requirement for that zone 201 is increased, for example by incrementing it by one.

Next, a heuristic is employed to determine whether to increase entry sample requirements for any zones 201. Location detector 103 determines 704 whether, in the last Q checks to enter any zone(s) 201, there have been fewer than or equal to R different winning access points 202.

If so, location detector 103 determines 705 whether, in the last Q checks to enter any zone(s) 201, no zone 201 has been entered.

If so, this is an indication that the zones 201 for the winning access points 202 have entry sample requirements that may be too high, resulting in an inability to enter a zone; accordingly, location detector 103 decreases the entry sample requirement for each zone 201 corresponding to one of the winning access points 202 in the last Q checks. For example, each of these entry sample requirements may be decremented by one.

In one embodiment, N=4, M=2, P=3, Q=4, and R=2, although one skilled in the art will recognize that any values can be used.

In one embodiment, the adjustment of step 703 is made only if, in the last N exits from any zone(s) 201, there was at least one winning access point 202.

In one embodiment, the adjustment of step 706 is made only if, in the last Q checks to enter any zone(s) 201, there was at least one winning access point 202.

The checks and actions described in connection with FIG. 7 implement a heuristic that helps ensure proper entry and exit in cases where signal strengths fluctuate frequently.

Effects of Settings and Parameters on Zones

The present invention provides several settings and parameters that can be used to adjust zone radius, time factors, and stickiness. The present invention is capable of self-adjustment to improve performance, by using heuristics for determining when to adjust such settings automatically. Specifically, zone entry and exit radii can be adjusted separately to compensate for problems such as signal fluctuation and interference. Additionally, an operator can use these settings and parameters to make some zones 201 large and "sticky" as well as change the amount of time required in a zone 201 before it is considered to have been entered.

The specific effects of each of the settings and parameters will be summarized in turn.

Sampling Interval

As discussed above, the sampling interval specifies how long zone detector 103 waits between samples when performing the steps of FIG. 4.

Decreasing the sampling interval decreases the exit radius 204 of a zone 201, by decreasing the amount of time before target 101 will recognize that it has exited zone 201, as the target moves away from the access point. Increasing the sampling interval increases the exit radius 204 of a zone 201, by increasing the amount of time before target 101 will recognize that it has exited zone 201, as the target moves away from the access point.

When the multiple zone allowance setting is set to true, increasing the sampling interval increases the probability of overlapping zones 201 and therefore increases the occurrence of presence in multiple zones 201. Note that in one embodiment, when target 101 is determined to be in more than one zone 201, a global sampling interval is used.

Figure 8:
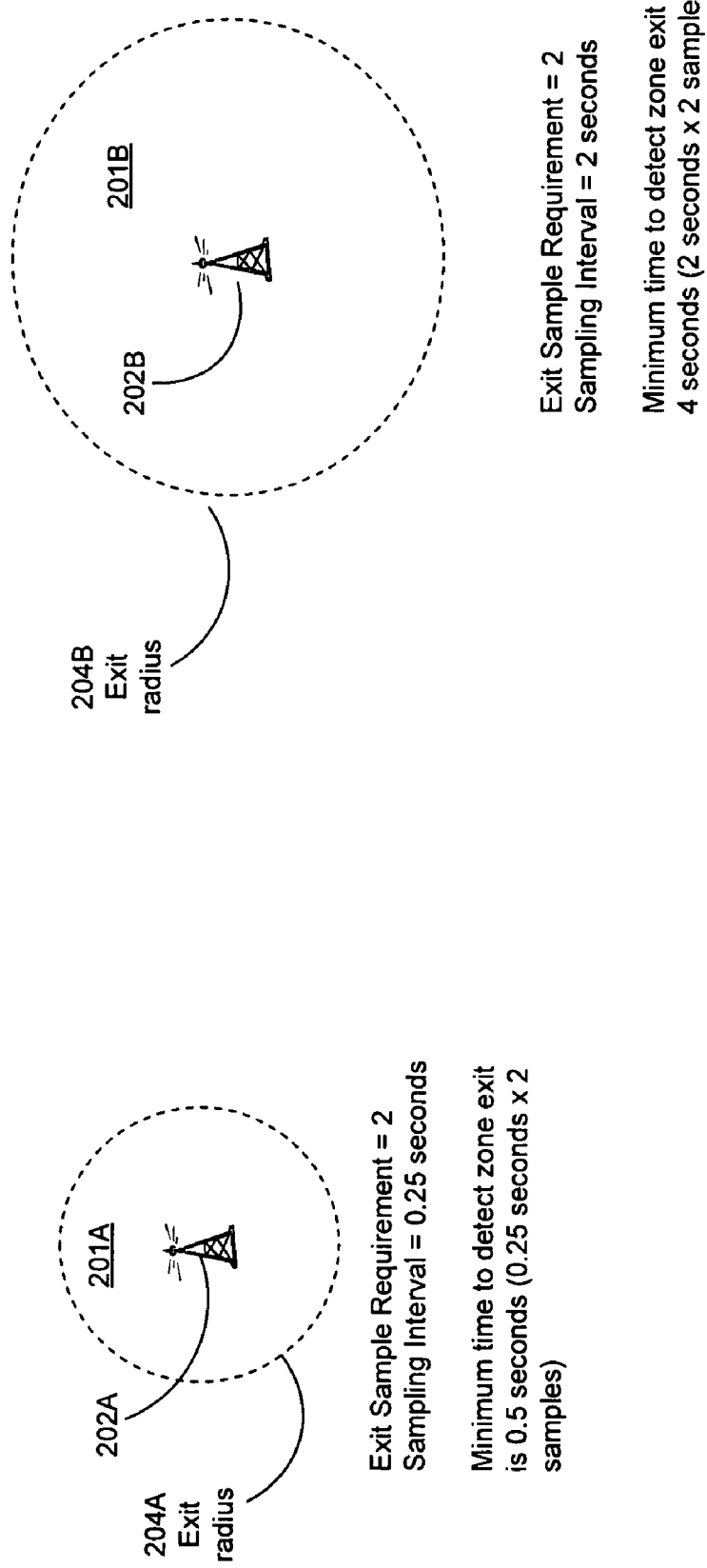
FIG. 8 is a diagram depicting an example of the effect of the sampling interval on the size of the exit radius of a zone.

Referring now to FIG. 8, there is shown an example of the effect of the sampling interval on the size of the exit radius 204 of a zone. Two access points 202A, 202B are shown. The exit sample requirement for both access points 202A, 202B is 2. However, the sampling interval for access point 202A is 0.25 seconds, while the sampling interval for access point 202B is 2 seconds. This means that as a target moves away, the minimum time for target 101 to detect that it has exited zone 201A is 0.5 seconds (0.25 seconds×2 samples), while the minimum time for target 101 to detect that it has exited zone 201B is 4 seconds (2 seconds×2 samples).

As a result, the effective exit radius 204B of zone 201B is larger than the exit radius 204A of zone 201A (assuming target 101 is moving at a constant speed). In general, increasing the sampling interval causes zone exits to be detected further from an access point 202 as target 101 moves away from the zone's 201 center.

In general, the sampling interval only impacts the size of a zone 201 that already has been entered, as each zone 201 may have its own sampling interval that is specific to a target 101 that currently is in zone 201. If target 101 is not in any zone 201 or in multiple zones 201, then the global default sampling interval is used.

Entry Sample Requirement

As discussed above, the entry sample requirement specifies how many consecutive samples are needed, with access point 202 being a winner, before target 101 will be recognized as having entered zone 201. Decreasing the entry sample requirement increases the entry radius 203 of a zone 201 by decreasing the number of consecutive wins needed to recognize entry into the zone 201, as target 101 moves towards its access point 202. Accordingly, decreasing the entry sample requirement decreases the amount of time needed in a zone before entry will be recognized as the zone 201 is approached by target 101.

Conversely, increasing the entry sample requirement decreases the entry radius 203 of a zone 201 by increasing the number of consecutive wins needed to recognize entry into the zone 201. Accordingly, increasing the entry sample requirement increases the amount of time needed in a zone before entry will be recognized.

When the multiple zone allowance setting is set to true, increasing the entry sample requirement decreases the probability of overlapping zones 201 and therefore decreases the occurrence of presence in multiple zones 201.

Figure 9:
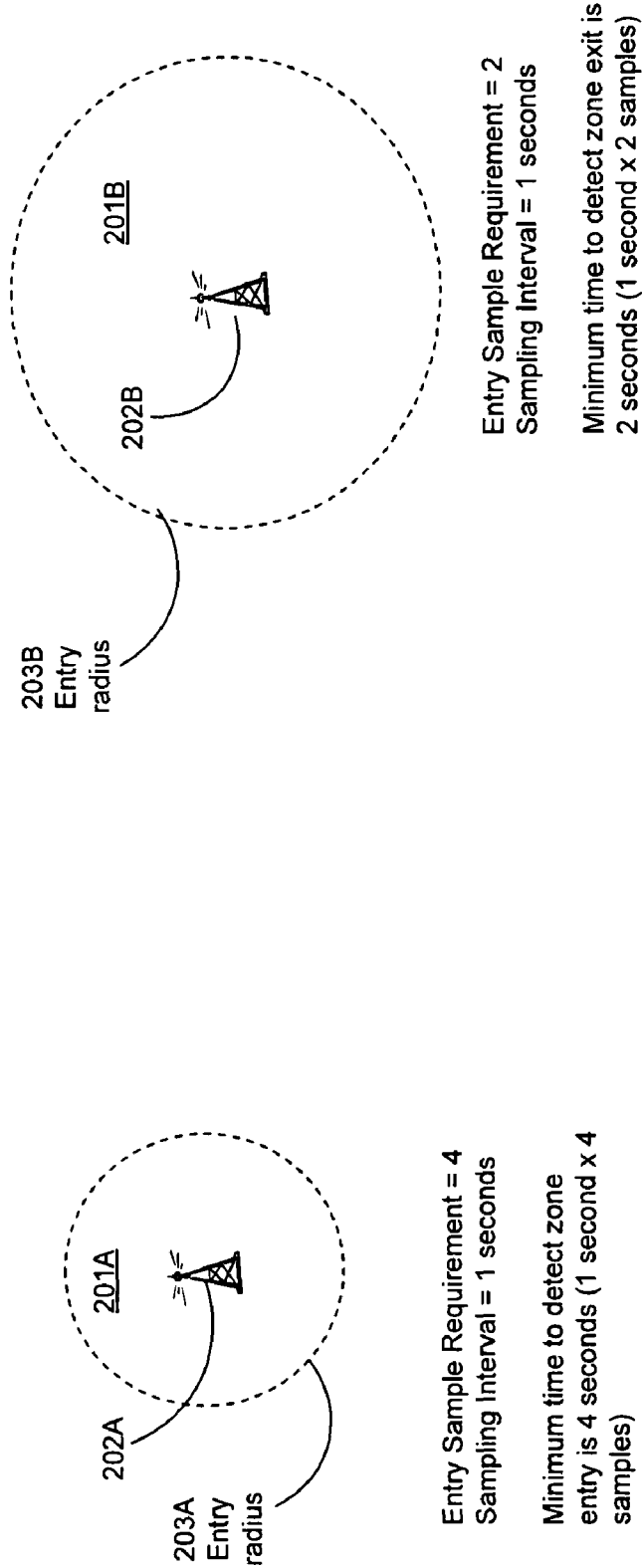
FIG. 9 is a diagram depicting an example of the effect of the entry sample requirement on the size of the entry radius of a zone.

Referring now to FIG. 9, there is shown an example of the effect of the entry sample requirement on the size of the entry radius 203 of a zone. Two access points 202A, 202B are shown. The sampling interval for both access points 202A, 202B is 1 second. However, the entry sample requirement for access point 202A is 4, while the entry sample requirement for access point 202B is 2. This means that the minimum time for target 101 to detect that it has entered zone 201A as it moves towards Zone 201A's access point is 4 seconds (1 second×4 samples), while the minimum time for target 101 to detect that it has entered zone 201B is 2 seconds (1 second×2 samples).

As a result, the effective entry radius 203B of zone 201B is larger than the entry radius 203A of zone 201A (assuming target 101 is moving at a constant speed), reflecting the fact that it generally takes longer to enter zone 201A because of the higher entry sample requirement.

Exit Sample Requirement

As discussed above, the exit sample requirement specifies how many consecutive samples are needed, with access point 202 not being a winner, before target 101 will be recognized as having exited zone 201. Decreasing the entry sample requirement decreases the exit radius 204 of a zone 201 by decreasing the number of consecutive non-wins needed to recognize exit from the zone 201. Accordingly, decreasing the exit sample requirement decreases the amount of time that target 101 is sufficiently distant from zone 201's access point before exit will be recognized.

Conversely, increasing the exit sample requirement increases the exit radius 204 of a zone 201 by increasing the number of consecutive non-wins needed to recognize exit from the zone 201. Accordingly, increasing the exit sample requirement increases the amount of time that target 101 is sufficiently distant from zone 201's access point before exit will be recognized.

When the multiple zone allowance setting is set to true, increasing the exit sample requirement increases the probability of overlapping zones 201 and therefore increases the occurrence of presence in multiple zones 201.

Figure 10:
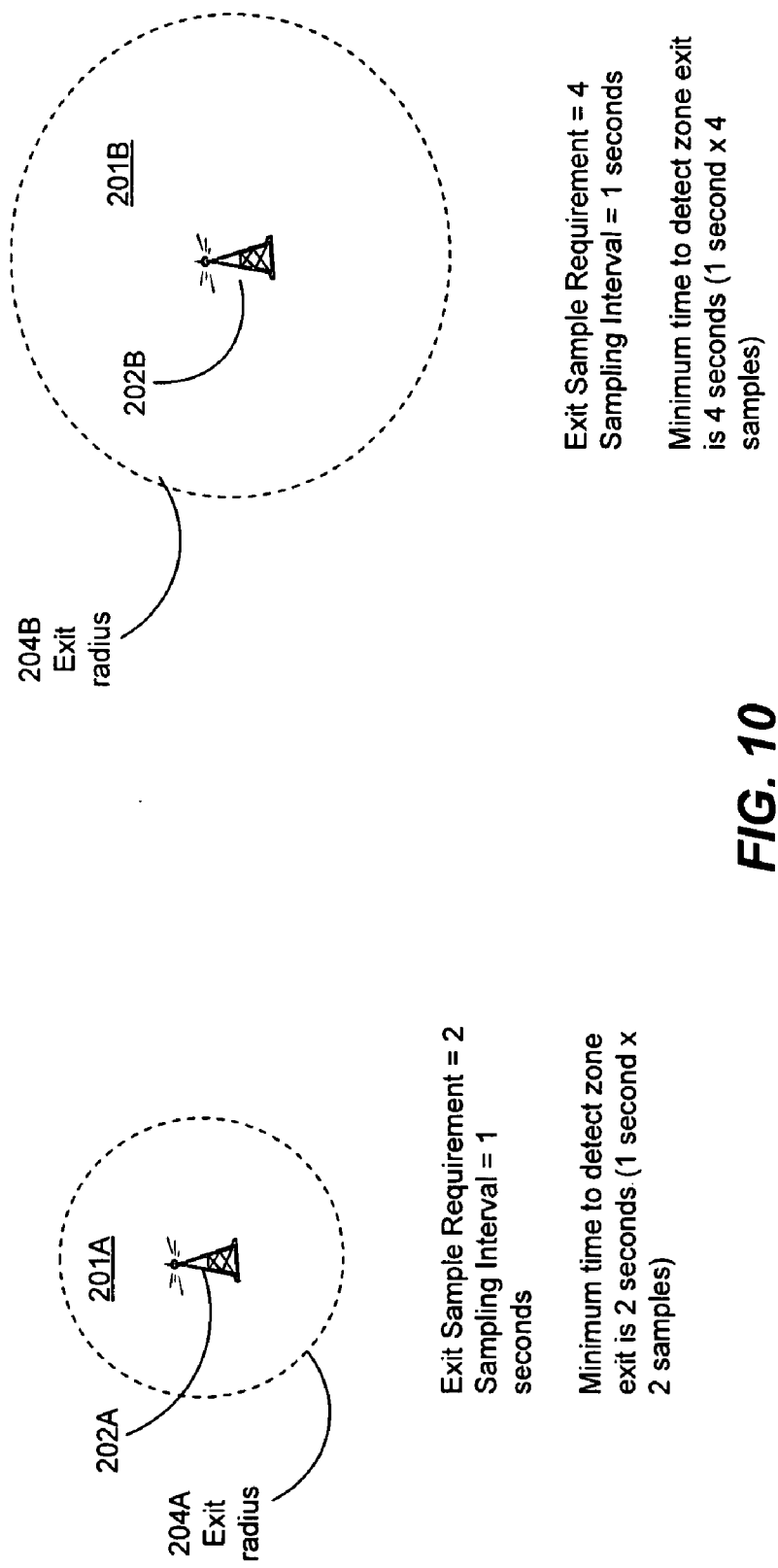
FIG. 10 is a diagram depicting an example of the effect of the exit sample requirement on the size of the exit radius of a zone.

Referring now to FIG. 10, there is shown an example of the effect of the exit sample requirement on the size of the exit radius 204 of a zone. Two access points 202A, 202B are shown. The sampling interval for both access points 202A, 202B is 1 second. However, the exit sample requirement for access point 202A is 2, while the entry sample requirement for access point 202B is 4. This means that the minimum time for target 101 to detect that it has exited zone 201A is 2 seconds (1 second×2 samples), while the minimum time for target 101 to detect that it has exited zone 201B is 4 seconds (1 second×4 samples).

As a result, the effective exit radius 204B of zone 201B is larger than the exit radius 204A of zone 201A (assuming target 101 is moving at a constant speed), reflecting the fact that it generally takes longer to exit zone 201B because of the higher exit sample requirement.

Signal Strength Margin Requirement

As discussed above, the signal strength margin requirement is the minimum signal strength difference between two access points 202 required to classify the signal strengths of the access points 202 as not equal to one another.

When the multiple zone allowance setting is set to false, if no access point 202 has a signal strength that exceeds all others by the signal strength margin requirement, then no winning access point 202 is designated. Thus, increasing the signal strength margin requirement has the effect of decreasing the entry and exit radii of all zones 201 by increasing the probability that no winning access point 202 will be designated.

When the multiple zone allowance setting is set to true, multiple winning access points 202 may be designated. Specifically, the access point 202 with the greatest signal strength is a winner. All access points 202 whose signal strength is not less than the greatest signal strength by more than the signal strength margin requirement, also are winners.

Data Structures

In one embodiment, the present invention uses the following data elements and structures. One skilled in the art will recognize that these data elements and structures are exemplary, and that other various can be used without departing from the essential characteristics of the present invention.

In one embodiment, each coverage area map in database 109 includes a list of access points 202 around which zones 201 are designated. In one embodiment, a zone descriptor is associated with each zone 201, containing the following information:

- An identifier for the access point 202 associated with the zone 201. In one embodiment where the invention is implemented using a Wi-Fi (802.11) wireless network, the identifier can be the MAC address or BSSID of the access point.
- A unique Zone ID.
- An entry sample requirement.
- An exit sample requirement.
- Sampling rate while in the zone.
- A zone broadcast parameter that enables/disables broadcasting of the current zone list each time a sample is taken.
- An auto-correction parameter that enables/disables automatic correction of toggling problems by automatically adjusting entry and exit sample requirements.

In one embodiment, only the identifier and Zone ID are required to have values. The other values may be empty, in which case default values are used. In one embodiment, each MAC Address/BSSID in a map must be unique and can have only one zone 201 assigned to it.

In one embodiment, zones 201 can be defined by more than one access point 202, if desired. For example, the corners or outer perimeter of coverage area 200 may be structured as a single zone 201 that is defined by several access points 202, with a set of small zones 201 inside.

In one embodiment, a coverage area map contains the following information:

1. A map identifier that uniquely identifies the coverage area map. One possible format for the map identifier consists of the following three components:
    A. Owner (text string)
    B. Coverage area (text string)
    C. Map number (integer)
2. A zone list that contains at least one zone descriptor as described above.
3. A multiple zone allowance parameter than specifies whether target 101 may occupy more than one zone.

4. A default entry sample requirement used when one is not specified for a zone 201.
5. A default exit sample requirement used when one is not specified for a zone 201.
6. A default sampling rate used when one is not specified for a zone 201, or when there is more than one current zone 201.
7. A default zone broadcast parameter used when one is not specified for a zone 201, or when there is more than one current zone 201.
8. A default auto-correction parameter.
9. An optional signal strength margin requirement.

A zone message contains information as to the location of target 101 and optionally, the user. It also contains the type of the message. In one embodiment, the zone message contains:
1. A timestamp containing the date and time of the message.
2. The map identifier of the map that is being used to determine the coverage area of target 101.
3. The message type which is either:
   A. Enter zone
   B. Exit zone
   C. Broadcast zone
4. The zone ID of the zone 201 being entered or exited.
5. The current zone list.
6. Optionally, additional data that is provided from location-based application 102 to zone detector 103 for transmittal to server 105. This may include information about target 101 such as user ID, SIM card, or the like, depending on the particulars of the application.

The present invention thus provides several mechanisms for addressing the problems of prior art location detection systems.

By allowing the relative sizes of zones 201 to be adjusted, the present invention allows for more accurate detection in environments where signal strength may fluctuate.

False positives can be reduced: Rather than change zones 201 as soon as a new zone's 201 access point 202 becomes a winner, the system of the present invention can be configured to require that a particular access point 202 be designated a winner multiple consecutive times before the zone 201 is considered entered. This reduces the occurrence of incorrect detection of zone 201 entry.

In addition, some zones 201 can be made sensitive to detection, if desired. Decreasing a zone's 201 entry sample requirement causes its detection sensitivity to increase, making its detection more likely at the risk of a false positive.

In addition, the present invention provides mechanisms for adjusting the "stickiness" of zones 201, so as to adjust the ease or difficulty with which a zone 201 is exited. Increasing the exit sample requirement while decreasing the entry sample requirement makes entry into a zone 201 more likely and makes exiting the zone 201 more difficult. This results in more total time being spent in a particular zone 201, thus increasing "stickiness". Conversely, increasing the entry sample requirement and decreasing the exit sample requirement makes entry into a zone 201 more difficult and makes exiting easier. This results in less total time being spent in a particular zone 201, thus decreasing "stickiness". Additional control over the time that is spent inside (or outside) a 201 zone is provided by the sampling rate parameter, as the minimum amount of time spent inside of a zone 201 is the zone's 201 exit sample requirement multiplied by the sampling interval.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be down-loaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computers referred to herein may include a single processor or may be architectures employing multiple processor designs for increased computing capability.

The algorithms and displays presented herein are not inherently related to any particular computer, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. In a coverage area comprising a plurality of zones, each zone corresponding to a region within the coverage area and being associated with at least one access point, each access point transmitting a wireless signal, the signal strength of each access point determinable at the target, and a current zone list which is comprised of a set of zero or more zones in which the target resides, or is believed to reside, a method of determining a current physical location for a target, comprising:
    a) initializing a threshold signal strength margin;
    b) determining at least one winning access point, based on the determined signal strengths for each access point and a threshold signal strength margin;
    c) determining, based on the determined at least one winning access point, a consecutive non-winner count, wherein the consecutive non-winner count is the consecutive number of times the access point has not been a winning access point, and a exit sample requirement, whether the target has exited any zones;
    d) determining, based on the determined at least one winning access point, a consecutive winner count, wherein the consecutive winner count is the consecutive number of times the access point has been a winning access point, and a entry sample requirement, whether the target has entered any zones.

2. The method of claim 1, further comprising, for each access point:
    a.1) initializing a consecutive winner count and
    a.2) initializing a consecutive non-winner count and
    a.3) initializing an entry sample requirement and
    a.4) initializing an exit sample requirement;
    wherein e) comprises, for each access point that is not a winning access point:
        e.1) setting the consecutive winner count for the access point to zero;
        e.2) responsive to the zone associated with the access point being on the current zone list:
            e.2.1) incrementing the consecutive non-winner count for the access point; and
            e.2.2) responsive to the consecutive non-winner count exceeding an exit sample requirement, identifying the zone as being exited by the target;
    and wherein g) comprises, for each access point that is a winning access point:
        g.1) setting the consecutive non-winner count for the access point to zero;
        g.2) responsive to the zone associated with the access point not being on the current zone list:
            g.2.1) incrementing the consecutive winner count for the access point; and
            g.2.2) responsive to the consecutive winner count exceeding an entry sample requirement, identifying the zone as being entered by the target.

3. The method of claim 2, wherein each zone is associated with an exit sample requirement and a entry sample requirement, and wherein:
    e.2.2) comprises, responsive to the consecutive non-winner count exceeding the exit sample requirement for the zone, identifying the zone as being exited by the target; and
    g.2.2) comprises, responsive to the consecutive winner count exceeding the entry sample requirement for the zone, identifying the zone as being entered by the target.

4. The method of claim 2, further comprising automatically adjusting at least one of the exit sample requirement and the entry sample requirement.

5. The method of claim 4, wherein automatically adjusting at least one of the exit sample requirement and the entry sample requirement comprises:
    responsive to a count of the number of different winning access points in the last N exits from zones being at least 1 and no more than M, and the same zone having been exited at least P times, increasing the exit sample requirement for the zone; and
    responsive to a count of the number of different winning access points in the last Q checks to enter a zone being at least 1 and no more than R, and no zone having been entered in the last Q checks to enter a zone, decreasing the entry sample requirement for each of the winning access points in the last Q checks;
    wherein N, M, P, Q, and R are predetermined numeric settings.

6. The method of claim 5 wherein N=4, M=2, P=3, Q=4, and R=2.

7. The method of claim 2, further comprising, responsive to detecting a degree of zone toggling exceeding a threshold, automatically adjusting at least one of the exit sample requirement and the entry sample requirement.

8. The method of claim 1, wherein determining at least one winning access point comprises identifying an access point having a signal strength exceeding, by at least a threshold signal strength margin, the signal strengths of all access point signals detectable at the target.

9. The method of claim 1, wherein determining at least one winning access point comprises:
    identifying a first access point having a strongest signal, as measured at the target, among signals detectable at the target; and identifying at least one additional access point, each having a signal strength that is no less than the signal strength of the first access point minus a threshold signal strength margin.

10. The method of claim 1, wherein determining at least one winning access point comprises:
   d.1) responsive to a multiple zone allowance setting being set to false, identifying a single winning access point; and
   d.2) responsive to the multiple zone allowance setting being set to true, identifying any number of winning access points.

11. The method of claim 1 wherein:
   identifying a single winning access point comprises identifying an access point having a signal strength exceeding, by at least a threshold signal strength margin, the signal strengths of all access point signals detectable at the target; and
   identifying any number of winning access points comprises:
      identifying a first access point having a strongest signal, as measured at the target, among signals detectable at the target; and
      identifying at least one additional access point, each having a signal strength that is no less than the signal strength of the first access point minus a threshold signal strength margin.

* * * * *